United States Patent [19]

Benoit, Jr. et al.

[11] Patent Number: 4,785,938

[45] Date of Patent: Nov. 22, 1988

[54] THERMOPLASTIC BAG PACK

[75] Inventors: Gordon L. Benoit, Jr., Macedon; R. Stuart Smith, Jr., Palmyra, both of N.Y.

[73] Assignee: Mobil Oil Corporation, New York, N.Y.

[21] Appl. No.: 44,273

[22] Filed: Apr. 30, 1987

Related U.S. Application Data

[63] Continuation-in-part of Ser. No. 925,752, Oct. 30, 1986, abandoned.

[51] Int. Cl.⁴ .............................................. B65D 33/14
[52] U.S. Cl. ...................................... 206/554; 383/8; 383/9
[58] Field of Search ....................... 206/554; 383/8, 9

[56] References Cited

U.S. PATENT DOCUMENTS

| | | | |
|---|---|---|---|
| 3,008,569 | 11/1961 | Murch | 206/554 |
| 4,085,822 | 4/1978 | Osborn | 186/1 A |
| 4,480,750 | 11/1984 | Dancy | 206/554 |
| 4,493,419 | 1/1985 | Prader et al. | 206/554 |
| 4,529,090 | 7/1985 | Pilon | 206/554 |
| 4,560,067 | 12/1985 | Reimann | 383/8 |
| 4,676,378 | 6/1987 | Baxley et al. | 383/9 |

FOREIGN PATENT DOCUMENTS 7946582 1/1982 Australia.

Primary Examiner—Stephen P. Garbe
Attorney, Agent, or Firm—Alexander J. McKillop; Michael G. Gilman; James P. O'Sullivan, Sr.

[57] ABSTRACT

A bag pack including a plurality of stacked bags each bag having loop handles which are integral extensions of the front and rear walls of the bag. Between the handles are a pair of superimposed single film tab members extending above the front and rear bag walls and above the open mouth portion of the bag. The front tab is coplanar with the front wall and either (1) completely unconnected thereto or (2) weakly connected thereto. The rear tab is coplanar with the rear wall and connected thereto through a localized line of film weakening which is comparatively stronger than (2) above. The individual bags may be bonded together through the tabs. The pack has suspension means in association therewith.

7 Claims, 2 Drawing Sheets

THERMOPLASTIC BAG PACK

This is a continuation-in-part application of copending Ser. No. 925,752, filed Oct. 30, 1986 now abandoned.

BACKGROUND OF THE INVENTION

This invention relates to a handled thermoplastic bag pack.

Thermoplastic handled grocery sacks have successfully competed with kraft paper grocery sacks and, indeed, are establishing an ever-increasing share of the market. The many beneficial attributes of plastic grocery sacks are responsible for this success Because of the nature of thin flexible thermoplastic film grocery sacks, the handleability, particularly during the bagging operation in supermarkets, leaves something to be desired.

A conventional manner of providing handled thermoplastic sacks is to arrange them in a lay-flat stack of 50, 100 or more and bond them together by way of an integral tab which extends upwardly from the bag mouth opening. This tab, in addition to providing the site at which the plurality of bags are bonded together, also constitutes the tear-off site for separation of individual bags from the bonded tabs. These bonded tabs also provide the site from which the pack of bags can be suspended from some suitable support means. For instance, a peg or flat tongue or similar suspension means may extend through an orifice in the bag tabs. U.S. Pat. Nos. 4,165,832 and 4,560,067, the subject matter of which are in their entirety, incorporated herein by reference, are examples of the type of thermoplastic grocery sacks and packs which form the subject of the instant invention.

While such bag pack assemblies generally function as intended during the support and dispensing of bags during a typical checkout procedure in a supermarket, for the purpose of easing congestion during checkout, any means which will assist in speeding up the checkout procedure would be an advance in this art. One cause for the slowdown in the bagging operation employing limp, thin-gauge, thermoplastic film bags is the tendency of the walls of the bags and the handles of the bags to cling together. The supermarket employee is slowed down in the bagging procedure by a need to carefully separate the front from the back wall of the bag preparatory to opening the bag and positioning it properly on its bag holder so that the mouth of the bag can be opened to receive goods. Not only does the nature of the film promote film to film adherence but the fact that the bag packs have been packed close together following manufacture and during transportation contributes to the reluctance of the films to separate. In addition to this, because the front panel of each bag is connected to its suspension tab there is no place for the bagger to easily insert his fingers or hand in order to pull the front wall or panel of the bag away from the rear panel to facilitate bagging.

It is an object of the invention to present a new and novel bag pack assembly which is not subject to the shortcomings of prior art thermoplastic film bag packs.

SUMMARY OF THE INVENTION

The bag pack of the present invention comprises a plurality of stacked bags made from thermoplastic film, each bag comprising front and rear walls; a bottom; an open mouth portion, handles which are integral extensions of said walls, said handles being located at opposite ends of said mouth portion; a pair of superimposed, single film tab members extending above said front and rear bag walls and above said open mouth portion, the front tab being coplanar with said front wall and either (1) completely unconnected thereto, or (2) weakly connected thereto, the rear tab being coplanar with said rear wall and connected thereto through a localized line of film weakening which is comparatively stronger than (2) above. There should be at least one suspension means in association with the bag pack to accommodate physical suspension of the pack. There also should be a bonding means in association with the bags to fasten all of said bag structures together.

DETAILED DESCRIPTION OF THE INVENTION

The bag packs of the present invention are constructed so as to be best suspended and dispensed from a bag pack holder and dispenser situated near the checkout counter of a supermarket. A representative bag pack holder and dispenser is that described in U.S. Pat. No. 4,062,170, the disclosure of which is in its entirety incorporated herein by reference. It is to be understood that other equivalent holder dispensers may be employed with the pack of the present invention. A structural common denominator of these holder dispensers is the fact that they are designed to support the entire pack of bags which may contain as many as 100 to 150 lay flat thermoplastic film bags of the type described herein. They are also designed so as to hold open and suspend the double film loop handles of the bag to accommodate the loading of the bag. The bag pack of the present invention will be described with the understanding that it can best be utilized with this type of bag pack holder dispenser but with the additional feature that individual bags will be held at three points or the equivalent of three points and, thus, better facilitate loading.

Figure 1:
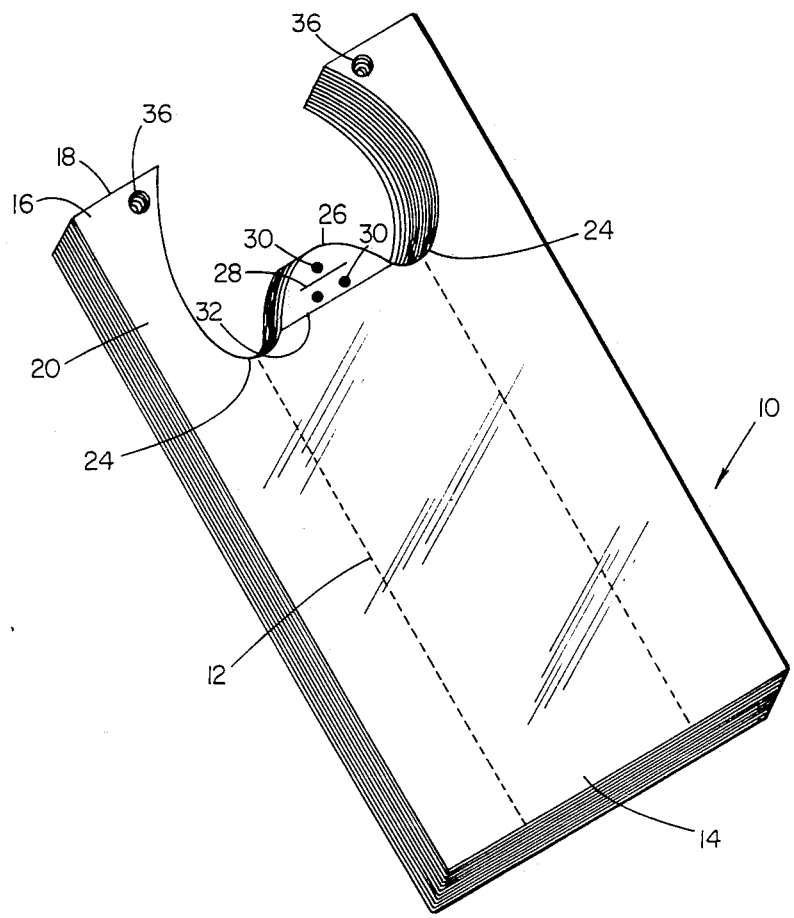
FIG. 1 is a perspective view of a stack of bags of one form of the bag structures of the present invention.

One form of the bag pack and bag pack structure of the present invention is shown in FIG. 1 of the accompanying drawing and it generally comprises a pack of handled bags 10. The individual bags are formed from a flattened, side-gusseted thermoplastic tube. The thermoplastic tube can be conveniently made of any thermoplastic film or blends of the same. Typical materials include the polyolefins, e.g., polyethylene, polypropylene, copolymers of ethylene and any other alpha olefin, etc. As indicated, the bags are side-gusseted as shown at 12 so as to provide a width dimension to the bags. It is to be understood however, that the bags need not be side gusseted but may have some other form, for example, a bottom gusset arrangement. The side gusset 12 represents a re-entrance or infolding of part of a flattened tube in a manner well known to those skilled in the art. The bags have a front panel 14 and a similar back panel 15 which is partially shown in FIG. 3. The individual bags have handles 16 which are integral extensions of the front and rear panels of the bag. Because the bag structure includes side gussets 12, the handles are composed of double film thicknesses. The individual bags of the bag pack shown, have handles which are wider at the top 18 than at the base 20 thereof. This is an optional but desirable feature which provides the user with more plastic film in the hand grip region in order to militate against the uncomfortable "roping" tendency when carrying a heavily loaded bag. A handle of more or less uniform dimensions is also contemplated.

The bag mouth opening will be generally defined by the top edge of the individual bag structure after it has been removed from the bag support tabs 26 and 27. The illustrated bag pack shows stress relief curves 24 near opposite ends of the bag mouth opening at the base of the handles. This preferred structure permits the bag mouth opening to be stressed without causing bag mouth tearing at regions intermediate these stress relief points.

As indicated, the regions 26 and 27 consist of two single film tab members in association with each bag and it is from these tab members that the bag pack is suspended from an orifice shown at 28. This is of course only but one type of suspension means. It is possible that the tabs could be suspended by other means, for example, a clamp arrangement securely holding all tabs together, thus, performing the function of being a suspension means and a bonding means for the individual bags. The bag pack can optionally be suspended by means of holes 36 of FIG. 1. These orifices can be located anywhere in association with the handles. A handle extension, as shown, or appendages anywhere inside the handle lines can have suspension holes therein. A preferred form of bonding is shown at 30, which represents a more or less cylindrical, thermally-formed, bond extending through all of the tab members. These small areas are melt-bonded throughout the entire thickness of the stack to form a bag pack. Ultrasonic means can easily effect this bonding.

Figure 2:
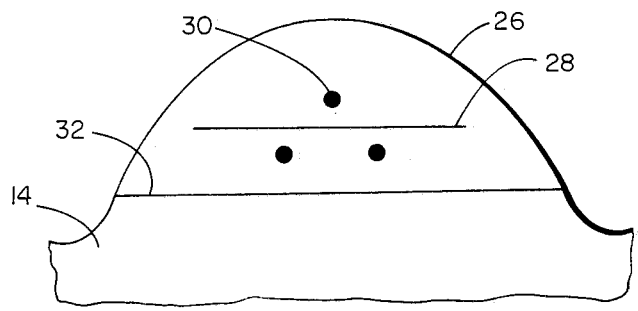
FIG. 2 is a line drawing illustrating part of the front wall at the bag mouth opening and its associated front bag tab.
Figure 3:
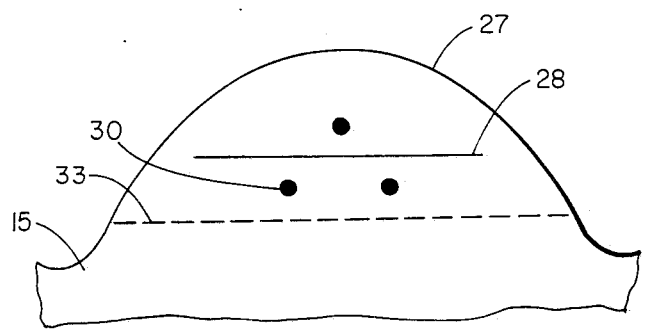
FIG. 3 is a line drawing illustrating part of the rear bag wall at the bag mouth opening and its associated rear bag tab.

Line 32 of FIG. 1 and FIG. 2 represents a line of complete severance between front panel 14 of each bag in the pack and front tab member 26 of each bag member. In other words the front panel of each bag is not in any way supported by the tabs 26. This provides what is known as a "front side free" bag pack arrangement. This is to be distinguished from the back panel or wall 15 of each bag, as partially illustrated in FIG. 3, which is connected to rear tab 27 by means of a line of film weakening 33. The particular line of film weakening shown in FIG. 3 is a series of inline interrupted cuts or severances arcing across the bottom of the tab in registration with severance line 32. Other forms of preweakening obviously can be employed, such as, a line of perforations, a line of thinning of thermoplastic film arcing across the tab, etc.

Figure 4:
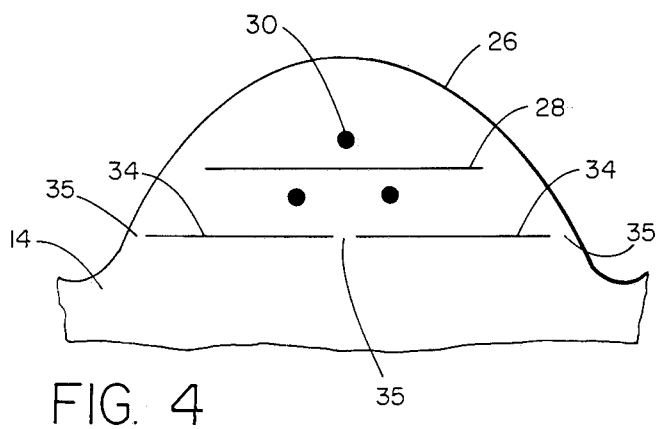
FIG. 4 is a line drawing illustrating an alternative part of the front wall of the bag mouth opening and its associated front bag tab.

FIG. 4 illustrates an alternative form of the front tab member and is designated 26'. This tab is generally the same as 26 of FIG. 2 except instead of having line 32, a line of complete severance between front panel 14 and front tab member 26, there is a severance line which leaves the front tab weakly connected to the front wall. Thus lines 34 are lines of severance through the front tab and points 35 provide the weak connections keeping the front tab connected to the front wall 14. This weak connection offers no serious resistance to freeing the front wall for bag loading access and functions in an equivalent manner to the "front side free" arrangement of FIG. 2. At the same time it has the advantage of preventing air from entering the gussetted tube during part transport while the bags and bag packs are being manufactured. In this way it prevents machine jamming and bag misalignment.

By providing the "front side free" or "substantially front side free" structure while the backside is still affixed to the rear tab, a considerable ease of handling aspect has been designed into the bag pack structure. With this innovation, a bag pack of the illustrated structure can be suspended in a bag pack holder dispenser such as that described in U.S. Pat. No. 4,062,170 or in copending U.S. application Ser. No. 036,599, filed Apr. 10, 1977 and Ser. No. 040,264, filed Apr. 17, 1987. The content of these disclosure are incorporated herein in their entirety. When it is desired to load a bag, the bagger can, with a wiping motion, pass his hand and fingers down across the face of tab 26 or 26', at the upper region of the bag mouth, at severance line 32 or 34 and can, with the same motion, pull the front panel 14 of the bag away from the back panel 15 away from and the bag pack. This act alone solves the time consuming problem of attempting to otherwise separate front panel 14 from rear panel 15 of the ba preparatory to placing the loop handles 16 over the handle holders of the bag pack holder dispenser device or otherwise opening the bag mouth. By this means, the productivity aspect of utilizing limp thermoplastic grocery sacks has been significantly increased. Bagging can be accomplished more efficiently and quicker than without this structural feature.

As indicated above, the localized line of film weakening 33 in the rear tab can be of any construction which will permit an individual bag to be separated preferentially along this line. The strength of this line of weakening should at least be strong enough to keep the empty bag attached t its associated tab until the beginning of the bagging operation, i.e., entry of the first items into the bag. Thus, it should stay affixed to the rear tab while the two handles are being placed over the handle support members of the bag pack holder and dispenser or the bag mouth otherwise kept opened and after this is accomplished then it should stay attached throughout at least the beginning of bagging. It is possible that after the first few items are placed in the bag, the connection at the line of weakening may disconnect, however, at this point the first goods in the bag will tend to keep the bag open and faciliate further loading of the bag. While it is difficult to accurately define the optimum strength of the film weakening at this point, it must be such as to maintain this third point of extension of the bag mouth opening at least through the beginning of the bagging operation. If the line of weakening is too strong, then there is a danger that when the loaded bag is pulled free, it may tear the back region of the bag mouth opening. Thus, the film weakening must be such as to definitely be predisposed to separate at this line only.

The orifices 28 and 36 can be of any suitable design or shape complementary to some suspension means placed within the orifices. For example, if the suspension means is a round or cylindrical peg then obviously the orifice would be circular in shape to receive the peg. A preferred suspension means is either a flat tongue-shaped member or a tongue-shaped wire-form member which is adapted to extend through a slit-like orifice in the tab as shown at 28. The dimensions of the slit orifice, which extends all the way through the plurality of stacked bag members, should tightly fit around the suspension means. Since a pack of bags of 50, 100 or 150, polyethylene film bags is quite heavy, there is a need to provide some peripheral reinforcement to the support orifice 28 so that during use it does not become distorted or enlarged. The front tab member 26 or 26' which is fully severed or partially severed from front wall 14, functions to provide this additional support about the periphery of the orifice. In addition, the bonding means shown in the drawings as fused regions 30, closely spaced from the orifice, contributes to the strengthening of orifice 28. These bonding means can be positioned both above and below the orifice in the manner described in U.S. Pat. No. 4,560,067, the disclosure of which is incorporated herein in its entirety.

The bag packs of the present invention may be prepared by any process or system which will result in the defined bag pack. One suitable technique can be described as follows:

A thermoplastic tube, for example, of a polyethylene film, is flattened and gusseted so that the gussets extend inwardly from the sides to an extent such as is shown, for example, in FIG. 1 at 12. Thereafter, the gusseted tube is sealed transversely along spaced lines which ultimately constitute the seals at the ends of the handles and at the bottom of the bag. By this technique a series of interconnected "pillowcases" is continuously formed. Thereafter, a suitable mechanism will cut out one end of the pillow case to simultaneously form the handles and tab members of the bags. At the same time a perforating tool will pierce through both tabs of the structure at points along lines 32 and 33. Before the perforating tool retracts from its perforating position a rotating cylinder or wheel makes contact with front wall 14 adjacent to the point of perforation of the front wall so as to sever front wall 14 from tab 26. This is one manner of forming severance line 32. Because of interfacial slip between front wall 14 and rear wall 15, rear wall 15 remains attached to tab 27 by means of preweakened line 33. Simultaneously with this operation or immediately following it, the bag and tab structure is separated from the advancing tube and a stack of registered bag structures is formed. When the appropriate number of bags are in the stack, the tabs are bonded together and simultaneously an orifice such as that shown at 28 is formed. It is to be understood that tab 26 can be severed from wall 14 by any other convenient technique.

When it is desired that the front tab be only weakly connected to the front wall of the bag, this can be accomplished by incompletely severing the front tab. Leaving small connecting regions, such as points 35 in FIG. 4, can be accomplished by first carefully piercing only the front side of the plastic tube stock during the gusset making operation of the bag making process. The piercing slots will correspond to severances 34 leaving small connecting points 35. Thereafter, a perforating tool will pierce through the front and back side of the gussetted tube in line with front slots 34. In the final bags, these operations will produce a front tab weakly connected to the front wall and a rear tab connected to the rear wall with a comparatively stronger connection by virtue of more and stronger connecting points.

It is to be understood that the bags described can vary in dimension and in materials. There is nothing critical about the gauge dimension of the film employed in the bag. The bag should be capable of carrying the normal supermarket bag load which can range anywhere from a few pounds to about 35 pounds.

What is claimed is:

1. A pack of bags comprising a plurality of stacked bags made from thermoplastic film, each bag comprising front and rear walls; a bottom; an open mouth portion having handles which are integral extensions of said walls, said handles being located at opposite ends of said mouth portion; a pair of superimposed single film tab members extending above said front and rear bag walls and above said open mouth portion; the front tab being coplanar with said front wall 1and completely unconnected thereto or (2) comparatively weakly connected thereto, the rear tab being coplanar with said rear wall and connected thereto through a localized line of film weakening which is comparatively stronger than the front tab-front wall connection.

2. The bag pack of claim 1 having a suspension means in association with said pack.

3. The bag pack of claim 2 having a suspension means in association with said tabs.

4. The bag pack of claim 2 having a plural suspension means in association with said tabs and with said handle.

5. The bag pack of claim 4 wherein said suspension means in association with said handles are orifices in said handles or in appendages of said handles.

6. The bag pack of claim 2 having bag bonding means connecting together the plurality of bags.

7. The bag pack of claim 6 wherein the individual bags have gusseted side walls.

* * * * *

UNITED STATES PATENT AND TRADEMARK OFFICE
CERTIFICATE OF CORRECTION

PATENT NO. : 4,785,938

DATED : November 22, 1988

INVENTOR(S) : G. L. Benoit, Jr. and R. S. Smith, Jr.

It is certified that error appears in the above-identified patent and that said Letters Patent is hereby corrected as shown below:

Col. 6, Claim 1, lines 31 and 32      "land completely unconnected thereto or (2)" should be replaced with --and--

Signed and Sealed this

Eleventh Day of September, 1990

Attest:

HARRY F. MANBECK, JR.

*Attesting Officer*      *Commissioner of Patents and Trademarks*